United States Patent
Nagae (10) Patent No.: US 11,173,957 B2
(45) Date of Patent: Nov. 16, 2021

(54) VEHICLE MOVEMENT CONTROL APPARATUS

(71) Applicant: TOYOTA JIDOSHA KABUSHIKI KAISHA, Toyota (JP)

(72) Inventor: Hajime Nagae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 16/544,393

(22) Filed: Aug. 19, 2019

(65) Prior Publication Data

US 2020/0148259 A1 May 14, 2020

(30) Foreign Application Priority Data

Nov. 9, 2018 (JP) .............................. JP2018-211209

(51) Int. Cl.
*B62D 15/02* (2006.01)
*B60W 30/18* (2012.01)

(52) U.S. Cl.
CPC ..... *B62D 15/025* (2013.01); *B60W 30/18163* (2013.01); *B60W 2520/10* (2013.01); *B60W 2554/4041* (2020.02); *B60W 2554/804* (2020.02)

(58) Field of Classification Search
CPC ........... B60W 30/12; B60W 2554/804; B60W 2554/4041; B60W 30/18163; B60W 2520/10; B60W 2420/42; B60W 2420/52; B60W 2710/20; B62D 15/025; B60T 2201/087
See application file for complete search history.

(56) References Cited

U.S. PATENT DOCUMENTS

| 6,263,270 | B1 | 7/2001 | Sato et al. | |
|---|---|---|---|---|
| 2006/0030987 | A1* | 2/2006 | Akita | B62D 15/025 701/41 |
| 2010/0145575 | A1* | 6/2010 | Switkes | B62D 15/025 701/41 |
| 2015/0166062 | A1* | 6/2015 | Johnson | B60W 10/20 701/41 |
| 2016/0152234 | A1* | 6/2016 | Kim | B60W 10/184 701/41 |

(Continued)

FOREIGN PATENT DOCUMENTS

| JP | 10-152063 A | 6/1998 |
|---|---|---|
| JP | 2006-321299 A | 11/2006 |

(Continued)

*Primary Examiner* — Mussa A Shaawat
(74) *Attorney, Agent, or Firm* — Sughrue Mion, PLLC (57) ABSTRACT

A vehicle movement control apparatus of the invention executes a steering control to change a steering angle of an own vehicle at a predetermined changing rate to cause the own vehicle to move along a target movement line set in an own vehicle lane. The apparatus determines that a predetermined responsive characteristic condition is satisfied when another other vehicle moves in a vehicle lane next to the own vehicle lane, and the other vehicle exists in a predetermined area. The apparatus increases the predetermined changing rate to a larger changing rate when the predetermined responsive characteristic condition is satisfied, compared with when the predetermined responsive characteristic condition is not satisfied.

12 Claims, 6 Drawing Sheets

(56) References Cited

U.S. PATENT DOCUMENTS

| | | | |
|---|---|---|---|
| 2016/0185388 A1* | 6/2016 | Sim | B60W 10/20 |
| | | | 701/41 |
| 2017/0088175 A1* | 3/2017 | Okuda | B62D 6/00 |
| 2017/0217477 A1* | 8/2017 | Akatsuka | B62D 5/0463 |
| 2017/0225711 A1* | 8/2017 | DeCia | B60W 50/085 |
| 2017/0277182 A1* | 9/2017 | May | B60W 50/082 |
| 2018/0050673 A1* | 2/2018 | D'sa | B60T 7/22 |
| 2018/0154937 A1* | 6/2018 | Tatsukawa | G06K 9/00798 |
| 2018/0178716 A1* | 6/2018 | Fujii | B60W 10/20 |
| 2018/0178838 A1* | 6/2018 | Inoue | B62D 5/0457 |
| 2018/0181130 A1* | 6/2018 | Inoue | G05D 1/021 |
| 2019/0061808 A1* | 2/2019 | Mizoguchi | G01C 21/26 |
| 2019/0094856 A1* | 3/2019 | Kawate | B60W 50/082 |
| 2019/0161116 A1* | 5/2019 | Moreillon | B62D 1/286 |
| 2019/0324464 A1* | 10/2019 | Yang | G05D 1/0214 |

FOREIGN PATENT DOCUMENTS

| | | |
|---|---|---|
| JP | 2008-195402 A | 8/2008 |
| JP | 2009-190464 A | 8/2009 |
| JP | 2010-006279 A | 1/2010 |

* cited by examiner

VEHICLE MOVEMENT CONTROL APPARATUS

BACKGROUND

Field

The invention relates to a vehicle movement control apparatus for controlling a movement of a vehicle to cause the vehicle to move in a vehicle lane.

Description of the Related Art

There is known a control apparatus for executing a steering control to cause an own vehicle to move along a target movement line (for example, see JP 10-152063 A). This control apparatus recognizes guide lines or lane markings on a road which the own vehicle moves on. Then, the control apparatus sets the target movement line defined by target positions in a width direction of a vehicle lane of the road, based on the recognized guide lines or the recognized lane markings.

Hereinafter, the vehicle lane in which the own vehicle moves may be referred to as "the own vehicle lane". Further, the vehicle lane next to the own vehicle lane may be referred to as "the next vehicle lane". Furthermore, another vehicle moving in the next vehicle lane may be referred to as "the next-lane vehicle".

The inventor of this application has realized that the own vehicle is displaced temporarily in the width direction of the own vehicle lane when the own vehicle overtakes the next-lane vehicle. The inventor of this application has also realized that the own vehicle is displaced temporarily in the width direction of the own vehicle lane when the next-lane vehicle overtakes the own vehicle.

Figure 6A:
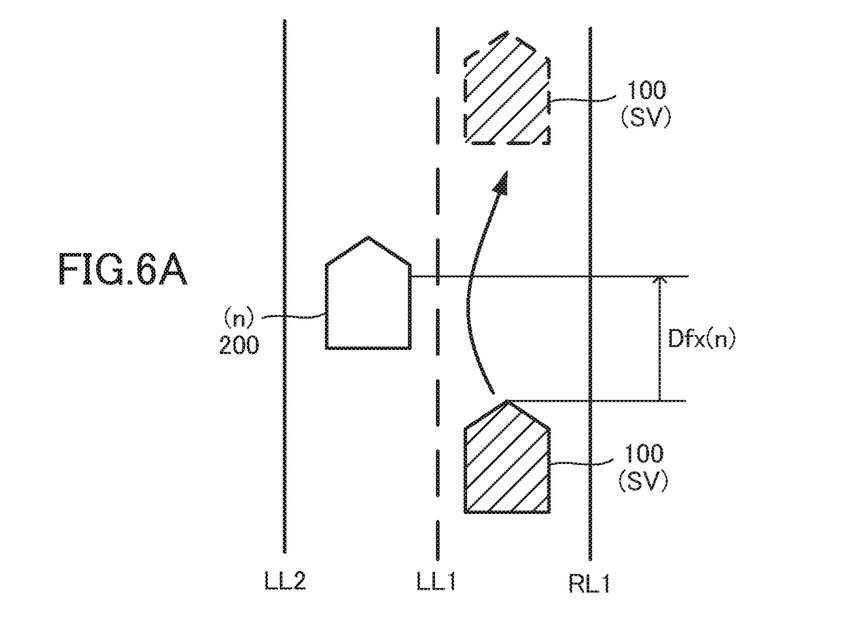
FIG. 6A is a schematic view for showing an influence of the next-lane vehicle on the own vehicle when the own vehicle overtakes the next-lane vehicle.

In particular, a low air pressure area is produced obliquely backward of the next-lane vehicle 200 due to airstream produced by the moving next-lane vehicle 200. Therefore, as shown in FIG. 6A, when the own vehicle 100 overtakes the next-lane vehicle 200, the own vehicle 100 is displaced in the width direction of the own vehicle lane and approaches the next-lane vehicle 200. A high air pressure area is produced at the side of the next-lane vehicle 200. Therefore, the own vehicle 100 is displaced in the width direction of the own vehicle lane, away from the next-lane vehicle 200 immediately after the own vehicle 100 overtakes the next-lane vehicle 200.

Figure 6B:
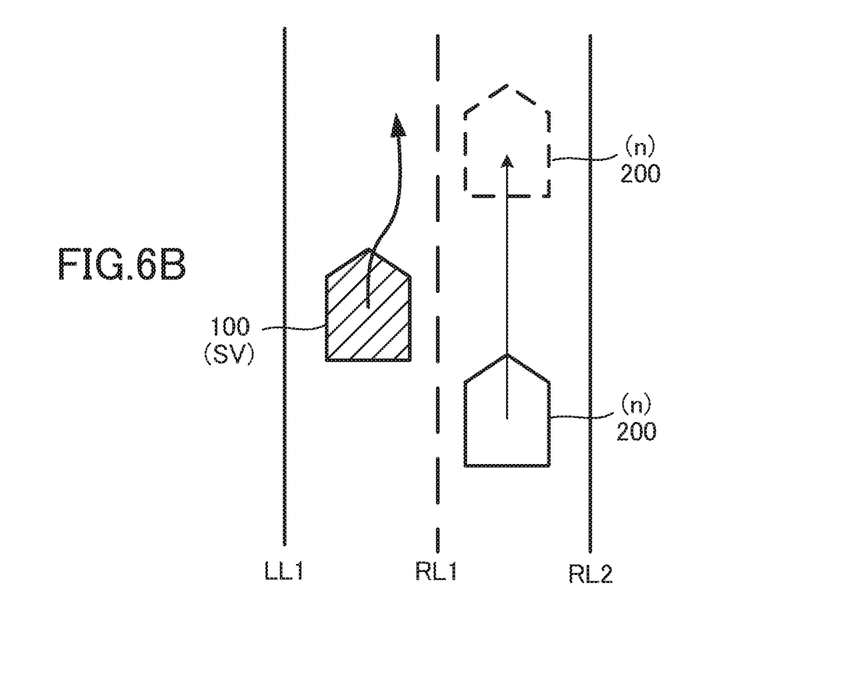
FIG. 6B is a schematic view for showing the influence of the next-lane vehicle on the own vehicle when the next-lane vehicle overtakes the own vehicle.

As described above, the high air pressure area is produced at the side of the next-lane vehicle 200. Therefore, as shown in FIG. 6B, when the next-lane vehicle 200 overtakes the own vehicle 100, the own vehicle 100 is displaced in the width direction of the own vehicle lane, away from the next-lane vehicle 200. Also, as described above, the low air pressure area is produced obliquely backward of the next-lane vehicle 200. Therefore, the own vehicle 100 is displaced in the width direction of the own vehicle lane and approaches the next-lane vehicle 200 immediately after the next-lane vehicle 200 overtakes the own vehicle 100.

Pressure change or the air stream produced by the next-lane vehicle 200 influences the own vehicle 100 during an execution of a lane keep control. In this case, a position of the own vehicle 100 in the width direction of the own vehicle lane may be displaced temporarily to a large extent due to the next-lane vehicle. Thereby, occupants of the own vehicle 100 may feel uneasy.

SUMMARY

An object of the invention is to provide a vehicle movement control apparatus which can reduce a displacement amount of the own vehicle in the width direction of the own vehicle lane due to the next-lane vehicle during the execution of the lane keep control, thereby preventing the occupants of the own vehicle from feeling uneasy.

A vehicle movement control apparatus according to the invention comprises at least one sensor (16) and an electronic control unit (10).

The at least one sensor (16) detects (i) a shape of an own vehicle lane (OLN) in which an own vehicle (100) moves and (ii) an object existing around the own vehicle (100).

The electronic control unit (10) is configured to acquire vehicle surrounding information on (i) the shape of the own vehicle lane (OLN) and (ii) the object, based on information provided from the at least one sensor (16).

The electronic control unit (10) is further configured to execute a steering control to change a steering angle of the own vehicle (100) at a predetermined changing rate, based on the vehicle surrounding information to cause the own vehicle (100) to move along a target movement line (ML) set in the own vehicle lane (OLN).

The electronic control unit (10) is further configured to determine whether the predetermined responsive characteristic condition is satisfied, based on the vehicle surrounding information.

The predetermined responsive characteristic condition is satisfied when (i) another vehicle (200) other than the own vehicle (100) moves in a vehicle lane (LLN, RLN) next to the own vehicle lane (OLN), and (ii) the other vehicle (200) exists in a predetermined area.

The predetermined area is defined by (i) a location ahead of the own vehicle (100) by a first distance (|D1th|) and (ii) a location behind the own vehicle (100) by a second distance (|D2th|).

The electronic control unit (10) is further configured to execute the steering control with increasing the predetermined changing rate to a larger changing rate when the electronic control unit (10) determines that the predetermined responsive characteristic condition is satisfied, compared with when the electronic control unit (10) determines that the predetermined responsive characteristic condition is not satisfied.

The inventor of this application has realized that air pressure change and/or airstream generated by the other vehicle moving in the vehicle lane next to the own vehicle lane influence a position of the own vehicle in a width direction of the own vehicle lane when (i) the own vehicle overtakes the other vehicle, or the other vehicle overtakes the own vehicle, and (ii) the other vehicle exists in the predetermined area.

According to the invention, the predetermined changing rate is increased when the predetermined responsive characteristic condition is satisfied, i.e., when the other vehicle moves in the vehicle lane next to the own vehicle lane, and the other vehicle exists in the predetermined area. Thereby, the own vehicle can be prevented from deviating from the target movement line to a large extent even when the air pressure change and/or the airstream around the other vehicle influence the own vehicle. As a result, the driver is unlikely to feel uneasy.

According to an aspect of the invention, the electronic control unit (10) may be configured to acquire a gap amount (dL, θL, ΣdL), based on the vehicle surrounding information. The gap amount (dL, θL, ΣdL) represents a gap between the target movement line (ML) and an actual line of movement of the own vehicle (100).

In this aspect, the electronic control unit (10) may be further configured to calculate a feedback control amount (K1\*CL+Kr\*(K2\*θL+K3\*dL+K4\*ΣdL)) including a value (Kr\*(K2\*θL+K3\*dL+K4\*ΣdL)) acquired by multiplying a value (K2\*θL+K3\*dL+K4\*ΣdL) depending on the gap amount (dL, θL, ΣdL) by a predetermined control gain (Kr).

In this aspect, the electronic control unit (10) may be further configured to execute the steering control, based on at least the feedback control amount (K1\*CL+Kr\*(K2\*θL+K3\*dL+K4\*ΣdL)) with increasing the predetermined changing rate to the larger changing rate by increasing the predetermined control gain (Kr) to a larger value when the electronic control unit (10) determines that predetermined responsive characteristic condition is satisfied, compared with the electronic control unit (10) determines that the predetermined responsive characteristic control is not satisfied.

According to another aspect of the invention, the electronic control unit (10) may be configured to acquire a gap correlation value (K2\*θL+K3\*dL+K4\*ΣdL), based on the vehicle surrounding information. The gap correlation value (K2\*θL+K3\*dL+K4\*ΣdL) correlates with a gap amount (dL, θL, ΣdL) representing a gap between the target movement line (ML) and an actual movement line of the own vehicle (100).

In this aspect, the electronic control unit (10) may be further configured to calculate a steering angle control amount (Kr\*(K2\*θL+K3\*dL+K4\*ΣdL)) for reducing the gap amount (dL, θL, ΣdL), based on the gap correlation value (K2\*θL+K3\*dL+K4\*ΣdL).

In this aspect, the electronic control unit (10) may be further configured to execute the steering control so as to change the steering angle of the own vehicle (100), based on the steering angle control amount (Kr\*(K2\*θL+K3\*dL+K4\*ΣdL)) with increasing the predetermined changing rate to the larger changing rate by increasing a ratio (Kr) of the steering angle control amount (Kr\*(K2\*θL+K3\*ΣdL+K4\*ΣdL)) relative to the gap correlation amount (K2\*θL+K3\*dL+K4\*ΣdL) to a larger ratio when the electronic control unit (10) determined that the predetermined responsive characteristic condition is satisfied, compared with when the electronic control unit (10) determines that the predetermined responsive characteristic condition is not satisfied.

According to these aspect of the invention, the control gain of the steering control or the ratio of the steering angle control amount relative to the gap correlation amount is increased when the predetermined responsive characteristic condition is satisfied. Therefore, the gap amount can be reduced promptly when the gap amount changes due to the air pressure change around the other vehicle influencing the own vehicle. Thereby, the own vehicle can be prevented from deviating from the target movement line to the large extent.

According to further another aspect of the invention, the electronic control unit (10) may be further configured to limit the predetermined changing rate to a predetermined upper limit (dθ\*Limit) when the predetermined changing rate is greater than the predetermined upper limit (dθ\*Limit).

In this aspect, the electronic control unit (10) may be further configured to execute the steering control with increasing the predetermined changing rate to the larger changing rate by increasing the predetermined upper limit (dθ\*Limit) to a larger limit when the electronic control unit (10) determines that the predetermined responsive characteristic condition is satisfied, compared with when the electronic control unit (10) determines that predetermined responsive characteristic condition is not satisfied.

According to further another aspect of the invention, the electronic control unit (10) may be configured to acquire a lateral distance (Dfy), based on the vehicle surrounding information. The lateral distance (Dfy) is a distance between the own vehicle (100) and the other vehicle (200) along a width direction of the own vehicle lane (OLN).

In this aspect, the electronic control unit (10) may be further configured to determine whether the lateral distance (Dfy) is equal to or smaller than a predetermined lateral distance threshold (D3th).

In this aspect, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, and (iii) the lateral distance (Dfy) is equal to or smaller than the predetermined lateral distance threshold (D3th).

When the lateral distance between the other vehicle and the own vehicle is large, the air pressure change and/or the airstream generated by the other vehicle are unlikely to influence the own vehicle. According to this aspect of the invention, the predetermined changing rate is not increased when the lateral distance is greater than the predetermined lateral distance threshold even if the other vehicle moves in the vehicle lane next to the own vehicle lane, and the other vehicle exists in the predetermined area. As a result, the own vehicle can be caused to move with stability by the steering control.

According to further another aspect of the invention, the electronic control unit (10) may be configured to acquire a relative movement speed (Vfx), based on the vehicle surrounding information. The relative movement speed (Vfx) is a difference between a movement speed of the own vehicle (100) and a movement speed of the other vehicle (200).

In this aspect, the electronic control unit (10) may be further configured to determine whether the relative movement speed (Vfx) is equal to or greater than a predetermined relative movement speed threshold (Vfxth).

In this aspect, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, (iii) the lateral distance (Dfy) is equal to or smaller than the predetermined lateral distance threshold (D3th), and (iv) the relative movement speed (Vfx) is equal to or greater than the predetermined relative movement speed threshold (Vfxth).

Alternatively, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, and (iii) the relative movement speed is equal to or greater than the predetermined relative movement speed threshold.

When the relative movement speed is small, the air pressure change and/or the airstream generated by the other vehicle is unlikely to influence the own vehicle. According to this aspect of the invention, the predetermined changing rate is not increased when the relative movement speed is smaller than the predetermined relative movement speed threshold even if the other vehicle moves in the vehicle lane next to the own vehicle lane, and the other vehicle exists in the predetermined area. As a result, the own vehicle can be caused to move with stability by the steering control.

According to further another aspect of the invention, the electronic control unit (10) may be configured to acquire a size (Si) of the other vehicle (200), based on the vehicle surrounding information.

In this aspect, the electronic control unit (10) may be further configured to determine whether the size (Si) of the other vehicle (200) is equal to or greater than a predetermined size threshold (Sith).

In this aspect, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, (iii) the lateral distance (Dfy) is equal to or smaller than the predetermined lateral distance threshold (D3th), (iv) the relative movement speed (Vfx) is equal to or greater than the predetermined relative movement speed threshold (Vfxth), and (v) the size (Si) of the other vehicle (200) is equal to or greater than the predetermined size threshold (Sith).

Alternatively, in this aspect, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, (iii) the relative movement speed (Vfx) is equal to or greater than the predetermined relative movement speed threshold (Vfxth), and (iv) the size (Si) of the other vehicle (200) is equal to or greater than the predetermined size threshold (Sith).

Alternatively, in this aspect, the electronic control unit (10) may be further configured to determine that the predetermined responsive characteristic condition is satisfied when (i) the other vehicle (200) moves in the vehicle lane (LLN, RLN) next to the own vehicle lane (OLN), (ii) the other vehicle (200) exists in the predetermined area, and (iii) the size (Si) of the other vehicle (200) is equal to or greater than the predetermined size threshold (Sith).

According to further another aspect of the invention, the electronic control unit (10) may be configured to acquire a longitudinal distance (Dfx), based on the vehicle surrounding information. The longitudinal distance (Dfx) is a distance between the own vehicle (100) and the other vehicle (200) along a longitudinal direction of the own vehicle lane (OLN).

In this aspect, the electronic control unit (10) may be further configured to execute the steering control with increasing the predetermined changing rate to the larger changing rate which increases as the longitudinal distance (Dfx) decreases when the electronic control unit (10) determines that the predetermined responsive characteristic condition is satisfied.

According to further another aspect of the invention, the electronic control unit (10) may be configured to acquire a relative movement speed (Vfx), based on the vehicle surrounding information. The relative movement speed (Vfx) is a difference between a movement speed of the own vehicle (100) and a movement speed of the other vehicle (200).

In this aspect, the electronic control unit (10) may be further configured to execute the steering control with increasing the predetermined changing rate to the larger changing rate which increases as the relative movement speed (Vfx) increases when the electronic control unit (10) determines that the predetermined responsive characteristic condition is satisfied.

The air pressure change and/or the airstream generated by the other vehicle is likely to influence the own vehicle as the relative movement speed of the other vehicle increases. According to this aspect of the invention, the predetermined changing rate is increased as the relative movement speed increases. Thereby, the responsive characteristic of the steering control can be improved appropriately.

According to further another aspect of the invention, the electronic control unit (10) may be configured to acquire a lateral distance (Dfy), based on the vehicle surrounding information. The lateral distance (Dfy) is a distance between the own vehicle (100) and the other vehicle (200) along a width direction of the own vehicle lane (OLN).

In this aspect, the electronic control unit (10) may be further configured to execute the steering control with increasing the predetermined changing rate to the larger changing rate which increases as the lateral distance (Dfy) decreases when the electronic control unit (10) determines that the predetermined responsive characteristic condition is satisfied.

The air pressure change and/or the airstream generated by the other vehicle is likely to influence the own vehicle as the lateral distance decreases. According to this aspect of the invention, the predetermined changing rate is increased as the lateral distance decreases. Thereby, the responsive characteristic of the steering control can be improved appropriately.

According to further another aspect of the invention, the electronic control unit (10) may be configured to acquire a size (Si) of the other vehicle (200), based on the vehicle surrounding information.

In this aspect, the electronic control unit (10) may be further configured to execute the steering control with increasing the predetermined changing rate to the larger changing rate which increases as the size (Si) of the other vehicle (200) increases when the electronic control unit (10) determines that the predetermined responsive characteristic condition is satisfied.

The air pressure change and/or the airstream generated by the other vehicle is likely to influence the own vehicle as the size of the other vehicle increases. According to this aspect of the invention, the predetermined changing rate is increased as the size of the other vehicle increases. Thereby, the responsive characteristic of the steering control can be improved appropriately.

According to further another aspect of the invention, the electronic control unit (10) may be configured to acquire a shape (Sh) of the other vehicle (200), based on the vehicle surrounding information.

In this aspect, the electronic control unit (10) may be further configured to execute the steering control with increasing the predetermined changing rate to the larger changing rate, depending on the shape (Sh) of the other vehicle (200) when the electronic control unit (10) determines that the predetermined responsive characteristic condition is satisfied.

The influence of the air pressure change and/or the airstream generated by the other vehicle to the own vehicle depend on the shape of the other vehicle. According to this aspect of the invention, the predetermined changing rate is increased, depending on the shape of the other vehicle. Thereby, the responsive characteristic of the steering control can be improved appropriately.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

A vehicle movement control apparatus according to an embodiment of the invention is applied to a vehicle. The vehicle movement control apparatus functions as a lane keep control apparatus to execute a lane keep control. Also, the vehicle movement control apparatus functions as a driving assist apparatus for assisting a driver's operation for driving the vehicle by executing the lane keep control. Hereinafter, the vehicle to which the vehicle movement control apparatus will be referred so as "the own vehicle 100" for distinguishing the own vehicle from vehicles other than the own vehicles. In addition, hereinafter, the vehicle movement control apparatus according to the embodiment will be referred to as "the embodiment apparatus".

<Configuration>

Figure 1:
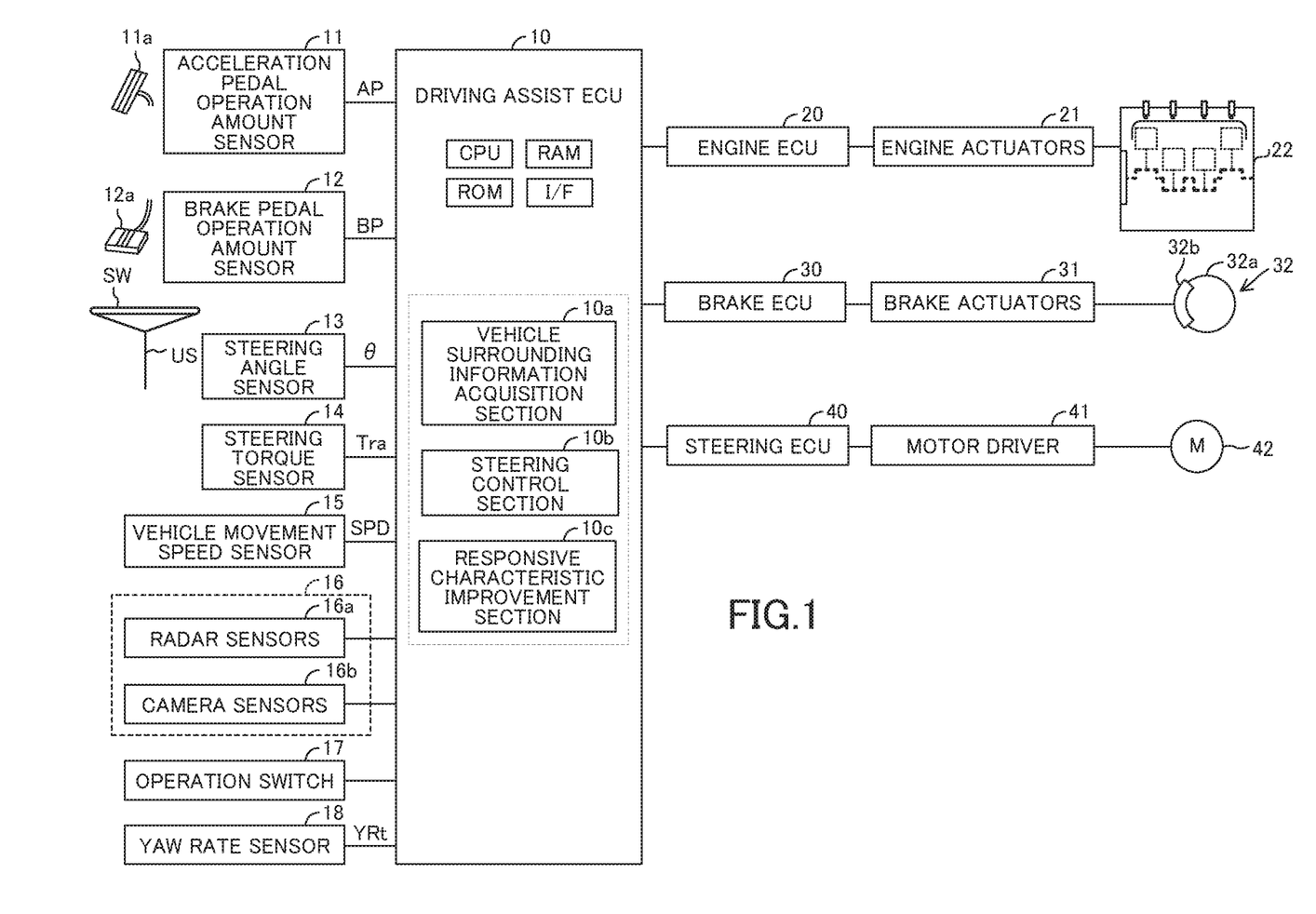
FIG. 1 is a schematic configuration view for showing a vehicle movement control apparatus according to an embodiment of the invention.

As shown in FIG. 1, the embodiment apparatus includes a driving assist ECU 10, an engine ECU 20, a brake ECU 30, and a steering ECU 40. Each of the ECUs 10, 20, 30, and 40 is an electronic control unit including a micro-computer as a main component. The ECUs 10, 20, 30, and 40 are electrically connected to one another via CAN (Controller Area Network) to receive and send information from and to one another. In this embodiment, the micro-computer includes a CPU, a ROM, a RAM, a non-volatility memory, an interface I/F, etc. The CPU realizes various functions by executing instructions, programs, or routines stored in the ROM.

The driving assist ECU 10 are electrically connected to sensors including a switch described below. The driving assist ECU 10 is configured to receive detection signals and output signals from the sensors. It should be noted that any of the sensors may be electrically connected to the other ECU 20, 30, or 40 other than the driving assist ECU 10. In this case, the detection signals or the output signals output from the sensor electrically connected to the other ECU are sent from the other ECU to the driving assist ECU 10 via the CAN.

An acceleration pedal operation amount sensor 11 detects an operation amount AP of an acceleration pedal 11a of the own vehicle 100, i.e., an acceleration opening degree of the acceleration pedal 11a. The acceleration pedal operation amount sensor 11 outputs a signal representing the detected operation amount AP of the acceleration pedal 11a.

A brake pedal operation amount sensor 12 detects an operation amount BP of a brake pedal 12a of the own vehicle 100. The brake pedal operation amount sensor 12 outputs a signal representing the detected operation amount BP of the brake pedal 12a.

A steering angle sensor 13 detects a steering angle θ of the own vehicle 100. The steering angle sensor 13 outputs a signal representing the detected steering angle θ.

A steering torque sensor 14 detects a steering torque Tra applied to a steering shaft US by a driver of the own vehicle 100 operating a steering wheel SW, The steering torque sensor 14 outputs a signal representing the detected steering torque Tra.

A vehicle movement speed sensor 15 detects a movement speed SPD of the own vehicle 100. The vehicle movement speed sensor 15 outputs a signal representing the detected vehicle movement speed SPD.

Surrounding sensors 16 acquire and output lane information and object information.

Figure 2A:
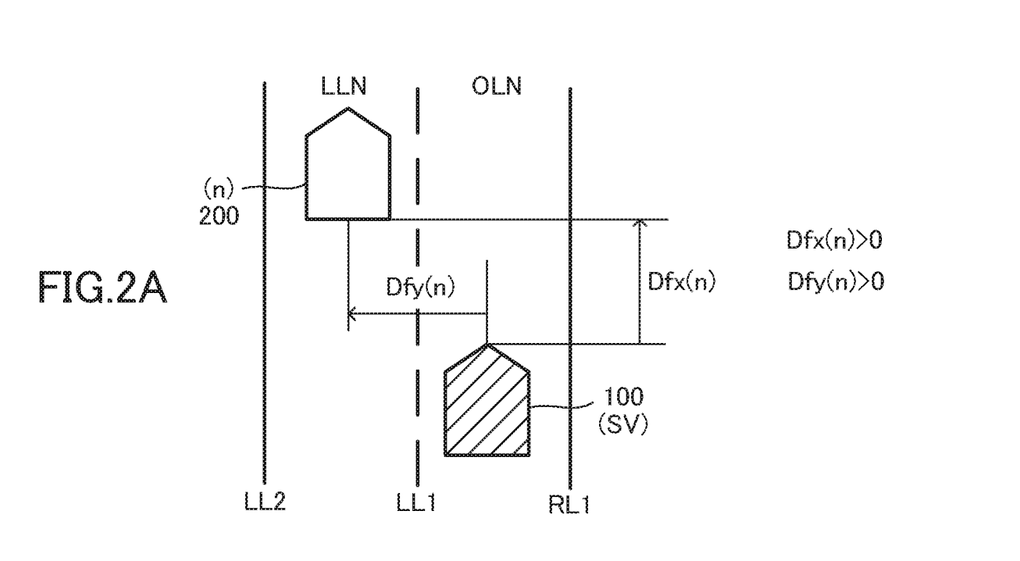
FIG. 2A is a schematic plan view for showing an own vehicle and a next-lane vehicle when the own vehicle moves behind the next-lane vehicle.
Figure 2B:
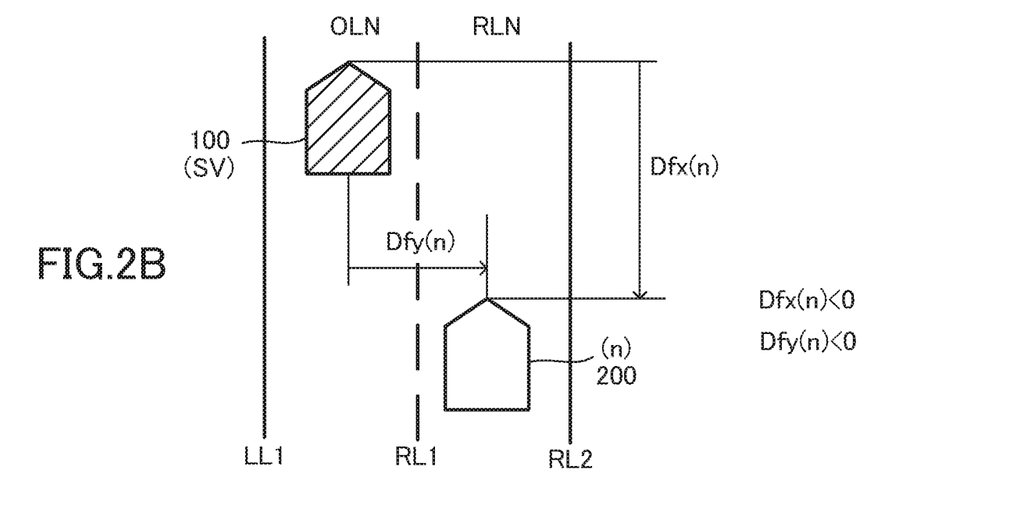
FIG. 2B is a schematic plan view for showing the own vehicle and the next-lane vehicle when the own vehicle moves ahead of the next-lane vehicle.

The lane information is information on a road around the own vehicle 100, in particular, ahead of the own vehicle 100, behind the own vehicle 100, and right and left sides of the own vehicle 100. The lane information includes information for specifying (I) positions of lane markings LL1 and RL1 defining an own vehicle lane OLN or (ii) distances from the own vehicle 100 to lane markings, respectively. The own vehicle lane OLN is a vehicle lane in which the own vehicle 100 moves. As shown in FIGS. 2A and 2B, in particular, the lane information includes information for specifying (i) the position of a left white lane marking LL1 defining a left side of the own vehicle lane OLN relative to the own vehicle 100 and (ii) the position of a right white lane marking RL1 defining a right side of the own vehicle lane OLN relative to the own vehicle 100. Further, as shown in FIG. 2A, the lane information includes information for specifying a position of a left white lane marking LL2 defining a left side of a left-side next vehicle lane LLN relative to the own vehicle 100. The left-side next vehicle lane LLN is a vehicle lane leftward next to the own vehicle lane OLN. In other words, the left-side nest vehicle lane LLN is a vehicle lane on the left side of the left white lane marking LL1. Furthermore, as shown in FIG. 2B, the lane information includes information for specifying a position of a right white lane marking RL2 defining a right side of a right-side next vehicle lane RLN relative to the own vehicle 100. The right-side next vehicle lane RLN is a vehicle lane rightward next to the own vehicle lane OLN. In other words, the right-side next vehicle lane RLN is a vehicle lane on the right side of the right white lane marking RL1. Hereinafter, the information on the white lane markings LL1, RL1, LL2, and RL2 will be also referred to as "the white lane marking information" or "the lane marking information".

The object information includes information on objects (n). The object (n) is a standing object existing around the own vehicle 100. The object (n) is, for example, another vehicle 100. As described below, the object information includes (i) information such as a longitudinal inter-vehicle distance Dfx(n), a longitudinal relative movement speed Vfx(n), a lateral inter-vehicle distance Dfy(n), and a lateral relative movement speed Vfy(n) representing relationships between the own vehicle 100 and the object (n), and (ii) information such as a height h(n), a width w(n), a length l(n), and a size Si(n) representing characteristics of the object (n).

As shown in FIGS. 2A and 2B, the longitudinal inter-vehicle distance Dfx(n) is a distance between a front end of the own vehicle 100 and a nearest portion of the object (n) such as the other vehicle 200 along a longitudinal center line of the own vehicle 100. The nearest portion of the object (n) is a portion of the object (n) nearest the own vehicle 100. The longitudinal center line is a line extending through a center of the own vehicle 100 in a longitudinal direction of the own vehicle 100. In this regard, when the own vehicle lane OLN is curved, the longitudinal inter-vehicle distance Dfx(n) does not strictly correspond to a distance between the own vehicle 100 and the object (n) along an extending line of the curved own vehicle lane OLN. However, in this embodiment, the longitudinal inter-vehicle distance Dfx(n) is deemed to correspond to the distance between the own vehicle 100 and the object (n) along the extending line of the own vehicle lane OLN.

When the object (n) exists ahead of the own vehicle 100 as shown in FIG. 2A, the longitudinal inter-vehicle distance Dfx(n) takes a positive value. On the other hand, when the object (n) exists behind the own vehicle 100 as shown in FIG. 2B, the longitudinal inter-vehicle distance Dfx(n) takes a negative value.

The longitudinal relative movement speed Vfx(n) corresponds to a difference between a movement speed Vn of the object (n) and a movement speed Vj of the own vehicle 100. The movement speed Vn of the object (n) is a movement speed of the object (n) in a movement direction of the own vehicle 100.

The lateral inter-vehicle distance Dfy(n) is a distance from the longitudinal center line of the own vehicle 100 to a lateral center position of the object (n). The lateral center position of the object (n) is located at a center of the object (n) in a direction perpendicular to the longitudinal center line of the own vehicle 100. For example, the lateral inter-vehicle distance Dfy(n) is a distance from the longitudinal center line of the own vehicle 100 to the lateral center position of the other vehicle 200. The center position of the other vehicle 200 is located at a center of the other vehicle 200 in a width direction of the other vehicle 200. When the object (n) locates at the left side of the own vehicle 100 as shown in FIG. 2A, the lateral inter-vehicle distance Dfy(n) takes a positive value. On the other hand, when the object (n) locates at the right side of the own vehicle 100 as shown in FIG. 2B, the lateral inter-vehicle distance Dfy(n) takes a negative value. A magnitude Dfy(n) of the lateral inter-vehicle distance Dfy(n) can be deemed as a distance between the own vehicle 100 and the object (n) in a lane width direction. The lane width direction corresponds to a direction along a width of the own vehicle lane OLN or a lateral direction of the own vehicle lane OLN.

The lateral relative movement speed Vfy(n) is a relative movement speed of the object (n) relative to the own vehicle 100 in the direction perpendicular to the longitudinal center line of the own vehicle 100. The lateral relative movement speed Vfy(n) corresponds to a temporal differentiation of the lateral inter-vehicle distance Dfy(n).

Figure 3:
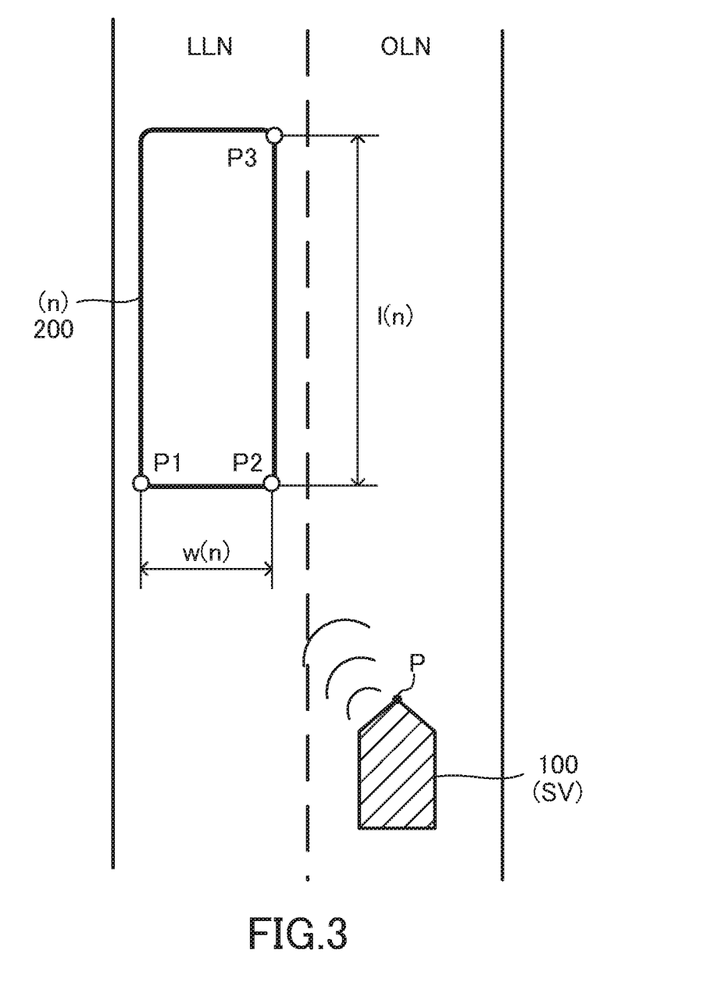
FIG. 3 is a schematic plan view for showing the own vehicle and reflection points of an object.

The height h(n) is a height of the object (n). Further, as shown in FIG. 3, the width w(n) is a length of the object (n) in the lane width direction. The length l(n) is a length of the object (n) in a lane longitudinal direction. The lane longitudinal direction corresponds to a direction along extension of the own vehicle lane OLN or a longitudinal direction of the own vehicle lane OLN.

In particular, as shown in FIG. 1, the surrounding sensors 16 include radar sensors 16a and camera sensors 16b.

The radar sensor 16a emits, for example, a wave of a millimeter wave band to an area around the own vehicle 100. Hereinafter, the wave of the millimeter wave band will be referred to as "the millimeter wave". Further, the radar sensor 16a receives the millimeter wave reflected by the object (n) existing around a range of the millimeter wave emitted from the radar sensor 16a. Hereinafter, the millimeter wave reflected by the object (n) will be referred to as "the reflected wave". The radar sensor 16a acquires a distance between each reflection point reflecting the emitted millimeter wave and a front point P of the own vehicle 100, a relative movement speed of each reflection point relative to a movement speed of the front point P, an orientation of each reflection point relative to the front point P, etc. by using the emitted millimeter wave and the reflected wave. The reflection points reflecting the emitted millimeter wave are, for example, reflection points P1, P2, and P3 shown in FIG. 3. Then, the radar sensor 16a acquires the object information such as the longitudinal inter-vehicle distance Dfx(n), the longitudinal relative movement speed Vfx(n), the lateral inter-vehicle distance Dfy(n), the lateral relative movement speed Vfy(n), the height h(n), the width w(n), and the length l(n), based on the distance between each reflection point and the front point P, the relative movement speed of each reflection point relative to the movement speed of the front point P, the orientation of each reflection point relative to the front point P, etc. It should be noted that as shown in FIG. 3, the radar sensor 16a groups the reflection points moving at the same movement speed in the same direction from among the reflection points P1 to P3 and specifies the object (n).

Each camera sensor 16b includes stereo cameras and an image processing section. Each stereo camera takes an image of a view at an area around the own vehicle 100 and acquires data of the image as image data. The area around the own vehicle 100 includes, for example, an area ahead of the own vehicle 100, an area at the right side of the own vehicle 100, an area at the left side of the own vehicle 100, an area behind the own vehicle 100, etc. The image processing section acquires the object information such as the longitudinal inter-vehicle distance Dfx(n), the longitudinal relative movement speed Vfx(n), the lateral inter-vehicle distance Dfy(n), the lateral relative movement speed Vfy(n), the height h(n), the width w(n), the length l(n), a shape Sh(n) and the lane information, based on the image data.

The shape Sh(n) is a parameter representing a shape of the object (n). The shape Sh(n) is represented by numerical number. In particular, the image processing section determines whether the object (n) is the other vehicle 200 by using teaching data. The teaching data includes a relationship between a previously prepared vehicle image and a vehicle shape. When the image processing section determines that the object (n) is the other vehicle 200, the image processing section classifies the object (n) in any of a type A (e.g., a sedan car), a type B (e.g., a two-box design car), a type C (i.e., a one-box car), a type D (e.g., a bus), and a type E (e.g., a truck) by using the teaching data. Then, the image processing section sets a value of the shape Sh(n), depending on a result of classifying the object (n). For example, the image processing section sets the value of the shape Sh(n) to "1" when the object (n) is classified in the type A. The image processing section sets the value of the shape Sh(n) to "2" when the object (n) is classified in the type B. The image processing section sets the value of the shape Sh(n) to "3" when the object (n) is classified in the type C. The image processing section sets the value of the shape Sh(n) to "4" when the object (n) is classified in the type D. The image processing section sets the value of the shape Sh(n) to "5" when the object (n) is classified in the type E.

In addition, the camera sensors 16b acquire the lane information and calculate (i) a shape of the own vehicle lane OLN, i.e., a curvature of the own vehicle lane OLN and (ii) a relationship in position between the own vehicle lane OLN and the own vehicle 100. The relationship in position between the own vehicle lane OLN and the own vehicle 100 is, for example, a distance from the left or right white lane marking LL1 or RL1 defining the own vehicle lane OLN to a center position of the own vehicle 100 in an own vehicle width direction. The own vehicle width direction corresponds to a direction along a width of the own vehicle 100 or a lateral direction of the own vehicle 100. Then, the camera sensors 16b send the lane information and the relationship in position between the own vehicle lane OLN and the own vehicle 100 to the driving assist ECU 10.

The driving assist ECU 10 synthesizes the information sent from the radar sensors 16a and the information sent from the camera sensors 16b to acquire the conclusive object information.

The driving assist ECU 10 calculates the size Si(n) by using the object information and an equation (1) described below. The size Si(n) is a size of the object (n). A value of a function f(l) in the equation (1) increases as the length l(n) of the object (n) increases.

$$Si(n)h*w*f(l) \tag{1}$$

An operation switch 17 shown in FIG. 1 is a switch operated by the driver of the own vehicle 100. The driver can select whether to execute the lane keep control described later by operating the operation switch 17.

A yaw rate sensor 18 detects a yaw rate YRt of the own vehicle 100. The yaw rate sensor 18 outputs the detected yaw rate YRt (actual yaw rate YRt).

The engine ECU 20 is electrically connected to engine actuators 21. The engine actuators 21 include a throttle valve actuator for adjusting an opening degree of a throttle valve of a spark-ignition type of an internal combustion engine 22. The engine ECU 20 changes a torque generated by the engine 22 by changing activations of the engine actuators 21. The torque generated by the engine 22 is transmitted to driven wheels (not shown) via a transmission (not shown). Therefore, the engine ECU 20 can change an acceleration of the own vehicle 100 by controlling the activations of the engine actuators 21 to control a driving force applied to the own vehicle 100.

It should be noted that when the own vehicle 100 is a hybrid vehicle, the engine ECU 20 can control the driving force applied to the own vehicle 100 from one or both of the internal combustion engine and an electric motor as vehicle driving sources. Further, when the own vehicle 100 is an electric vehicle, the engine ECU 20 can control the driving force applied to the own vehicle 100 from an electric motor as the vehicle driving source.

The brake ECU 30 is electrically connected to brake actuators 31. Each brake actuator 31 is provided in a hydraulic pressure circuit between a master cylinder (not shown) and a respective friction brake mechanisms 32. The master cylinder is a device for pressurizing hydraulic oil by a pressing force applied to the brake pedal 12a by the driver. Each friction brake mechanism 32 is provided to each of a left front wheel, a right front wheel, a left rear wheel, and a right rear wheel of the own vehicle 100.

Each brake actuators 31 adjusts a hydraulic pressure applied to a respective wheel cylinder, depending on a command sent from the brake ECU 30. The wheel cylinder is installed in a respective brake caliper 32b of the respective friction brake mechanism 32. The wheel cylinder is activated by the applied hydraulic pressure to press a respective brake pad (not shown) to a respective brake disc 32a to generate a friction braking force. Therefore, the brake ECU 30 can change the acceleration of the own vehicle 100, in particular, a deceleration or the negative acceleration of the own vehicle 100 by controlling activations of the brake actuators 31 to control the braking force applied to the own vehicle 100.

The steering ECU 40 is a control device of a known electric power steering system. The steering ECU 40 is electrically connected to a motor driver 41.

The motor driver 41 is electrically connected to a steering motor 42. The steering motor 42 is installed in a steering mechanism. The steering mechanism includes the steering wheel SW, the steering shaft US coupled to the steering wheel SW, a steering gear mechanism (not shown), etc.

The steering motor 42 generates a torque by electric power supplied from the motor driver 41. The steering motor 42 can apply this torque as a steering assist torque or steer the left and right vehicle-steered wheels by this torque. In other words, the steering motor 42 can change the steering angle of the own vehicle 100.

<Summary of Operation>

Next, a summary of an operation of the embodiment apparatus will be described.

<Lane Keep Control>

The driving assist ECU 10 executes the lane keep control when an execution of the lane keep control is requested by an occupant of the own vehicle 100 operating the operation switch 17. The lane keep control is also called as an LTA (=Lane Trace Assist), an LKA (=Lane Keeping Assist), etc.

Figure 4:
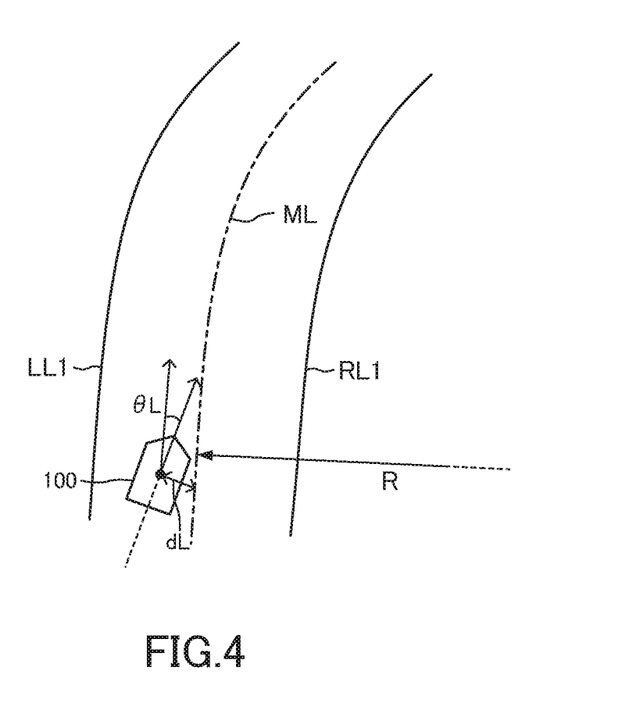
FIG. 4 is a view for showing a left white lane marking, a right white lane marking, a target movement line, a lateral difference, and a yaw angle.

When the execution of the lane keep control is requested, the driving assist ECU 10 sets a center line ML of the own vehicle lane OLN as a target movement line ML as shown in FIG. 4. The center line ML of the own vehicle lane OLN is a line defined by connecting points each locating at a center between the left white lane marking LL1 and the right white lane marking RL1 in the lane width direction. The driving assist ECU 10 executes the lane keep control to control the steering angle of the own vehicle 100 so as to maintain a lateral position of the own vehicle 100 at around the target movement line ML to assist a steering operation performed by the driver (for example, see JP 2008495402 A, JP 2009-190464 A, JP 2010-6279 A, etc.). It should be noted that the lateral position of the own vehicle 100 is a position of the own vehicle 100 in the lane width direction.

In particular, as shown in FIG. 4, the driving assist ECU 10 calculates a curve radius R of the center line ML as the target movement line ML by a known method. Then, the driving assist ECU 10 calculates an inverse of the curve radius R as a curvature CL (=1/R) of the target movement line ML. It should be noted that the curvature CL is information on the shape of the own vehicle lane OLN and is included in the lane information. Hereinafter, the lane information, the object information, etc. may be referred to as "the vehicle surrounding information". Therefore, the driving assist ECU 10 includes a vehicle surrounding information acquisition section 10a shown in FIG. 1 as a functional section.

Further, as shown in FIG. 4, the driving assist ECU 10 calculates a distance dL and an angle difference θL, based on the vehicle surrounding information. The distance dL is a distance or a displacement amount between (i) the center position of the own vehicle 100 in the own vehicle width direction and (ii) the target movement line ML. Hereinafter, the distance dL will be referred to as "the lateral difference dL". The angle difference θL is an angle defined by a direction or tangential direction of the target movement line ML and the movement direction of the own vehicle 100. Hereinafter, the angle difference θL will be referred to as "the yaw angle θL". The lateral difference dL and/or the yaw angle θL are gap amounts each representing a gap of an actual line of the movement of the own vehicle 100 relative to the target movement line ML. In particular, the lateral difference dL and/or the yaw angle θL are gap amounts each representing an actual position or an actual movement direction of the own vehicle 100 relative to the target movement line ML. It should be noted that the lateral difference dL and the yaw angle θL are values with plus or minus signs.

The driving assist ECU 10 updates the curvature CL, the yaw angle θL, and the lateral difference dL each time a predetermined time elapses. Then, the driving assist ECU 10 applies the curvature CL, the yaw angle θL, and the lateral difference dL to an equation (2) described below to calculate a target steering angle θ*. In addition, the driving assist ECU 10 sends information such as the target steering angle θ* to the steering ECU 40. The steering ECU 40 controls an activation of the steering motor 42 so as to control the actual steering angle θ to the target steering angle θ*. In the equation (2), K1, K2, K3, K4, and Kr are control gains. Therefore, the driving assist ECU 10 includes a steering control section 10b as shown in FIG. 1 or a lane keep control section as a functional section.

$$\theta^* = K1*CL + Kr*(K2*\theta L + K3*dL + K4*\Sigma dL) \quad (2)$$

In the equation (2), a first term K1*CL in the right side is a feedforward control term and/or a feedforward control amount. The feedforward control term changes, depending on a shape of the target movement line ML.

In the equation (2), a second term Kr*(K2*θL+K3*dL+K4*ΣdL) in the right side is a feedback control term, a feedback control amount, a steering angle control amount for reducing the gap amounts, etc. The feedback control term functions to reduce various differences θL, dL, and ΣdL relative to the target movement line ML to zero. In particular, the term K4*ΣdL is an integral control term. The integral control term functions to absorb a steady-state error.

<Process to Change Control Response Characteristics in Lane Keep Control>

As shown in FIG. 6A, when the own vehicle 100 overtakes the other vehicle 200 moving in the next vehicle lane LLN, the own vehicle 100 is subject to a force or a negative pressure for displacing the own vehicle 100 toward the other vehicle 200 in the lane width direction and then, a force or a positive pressure for causing the own vehicle 100 to move away from the other vehicle 200 in the lane width direction. Thereby, a position of the own vehicle 100 in the lane width direction changes as shown by an arrow. Hereinafter, the other vehicle 200 moving in the next vehicle lane LLN or RLN will be referred to as "the next-lane vehicle 200".

As shown in FIG. 6B, when the next-lane vehicle 200 overtakes the own vehicle 100, the own vehicle 100 is subject to the force or the positive pressure for displacing the own vehicle 100 away from the next-lane vehicle 200 in the lane width direction and then, the force or the positive pressure for displacing the own vehicle 100 toward the next-lane vehicle 200 in the lane width direction. Thereby, the position of the own vehicle 100 in the lane width direction changes as shown by an arrow.

In these cases, the position of the own vehicle 100 in the lane width direction changes even when the lane keep control is executed. Thus, the driver of the own vehicle 100 may feel uneasy.

According to a study performed by the inventor of this application, the inventor has realized that the position of the own vehicle 100 in the lane width direction is likely to be subject to an air pressure change and/or an airstream generated by the next-lane vehicle 200 when (i) the own vehicle 100 overtakes the next-lane vehicle 200, or the next-lane vehicle 200 overtakes the own vehicle 100, (ii) the longitudinal inter-vehicle distance Dfx(200) is equal to or greater than a second predetermined threshold D2th which is a negative value, and (iii) the longitudinal inter-vehicle distance Dfx(200) is equal to or smaller than a first predetermined threshold D1th which is set to a positive value. The longitudinal inter-vehicle distance Dfx(200) is a distance between the front end of the own vehicle 100 and the nearest portion of the next-lane vehicle 200 along the longitudinal center line of the own vehicle 100.

Accordingly, the driving assist ECU 10 determines whether a first condition described below is satisfied.

First condition is a condition that (i) there is the next-lane vehicle 200, and (ii) the longitudinal inter-vehicle distance Dfx(200) is equal to or greater than the second predetermined threshold D2th and is equal to or smaller than the first predetermined threshold D1th.

It should be noted that a magnitude D1th of the first predetermined threshold D1th may be different from a magnitude D2th of the second predetermined threshold D2th or may be the same as the magnitude D2th of the second predetermined threshold D2th. Further, one of the first and second predetermined thresholds D1th and D2th may be zero.

In other words, the first condition is as follows.

The first condition is a condition that the next-lane vehicle 200 which is the other vehicle moving in the vehicle lane next to the own vehicle lane OLN is in a predetermined area defined by (i) a location forwardly away from the own vehicle 100 by a first distance in the lane longitudinal direction and (ii) a location rearwardly away from the own vehicle 100 by a second distance in the lane longitudinal direction. The first distance is equal to the magnitude |D1th| of the first predetermined threshold D1th, and the second distance is equal to the magnitude |D2th| of the second predetermined threshold D2th.

When the first condition is satisfied, the driving assist ECU 10 determines that a responsive characteristic condition is satisfied. In other words, when the first condition is satisfied, the driving assist ECU 10 determines that the own vehicle 100 is likely to be displaced in the lane width direction by the air pressure change and/or the airstream around the next-lane vehicle 200. When the driving assist ECU 10 determines that the responsive characteristic condition is satisfied, the driving assist ECU 10 improves responsive characteristic of the lane keep control. The responsive characteristic of the lane keep control is a control characteristic correlating with a responsive speed of a steering control to eliminate the gap between the own vehicle 100 and the target movement line ML.

In particular, the driving assist ECU 10 sets the control gain Kr, i.e., a proportional control gain Kr in the equation (2) to a predetermined normal value Krnormal when the driving assist ECU 10 determines that the responsive characteristic condition is not satisfied. On the other hand, the driving assist ECU 10 sets the control gain Kr to a responsive characteristic improvement value Krhigh larger than the predetermined normal value Krnormal when the driving assist ECU 10 determines that the responsive characteristic condition is satisfied.

Thereby, when at least one of the lateral difference dL and the yaw angle θL increases, the feedback control term Kr*(K2*θL+K3*dL+K4*ΣdL) increases promptly. Thus, the target steering angle θ* is changed promptly. Therefore, even when the own vehicle 100 is subject to the air pressure change and/or the airstream around the next-lane vehicle 200, the own vehicle 100 is prevented from being displaced largely away from the target movement line ML. Therefore, the driving assist ECU 10 includes a responsive characteristic improvement section 10c shown in FIG. 1 or a responsive characteristic changing section as a functional section.

It should be noted that when the control gains K2, K3, and K4 are constant, the value K2*θL+K3*dL+K4*ΣdL is a correlation amount correlating with the gap amounts. Thus, the control gain Kr is a ratio of the steering angle control amount relative to the correlation amount, in particular, a ratio of a magnitude of the steering angle control amount relative to a magnitude of the correlation amount. Alternatively, the control gain Kr is a value correlating with the ratio of the steering angle control amount relative to the correlation amount.

<Concrete Operation>

Figure 5:
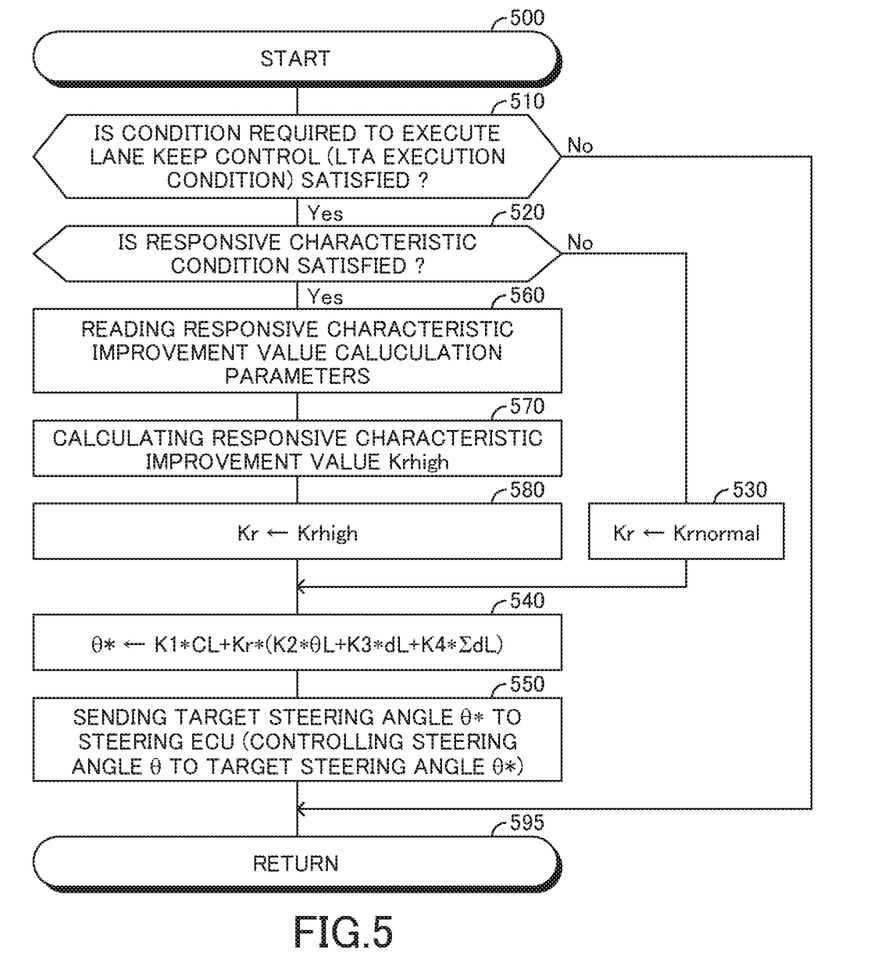
FIG. 5 is a view for showing a flowchart of a routine executed by a CPU of a driving assist ECU shown in FIG. 1.

The CPU of the driving assist ECU 10 executes a routine shown in FIG. 5 with a predetermined time interval.

Therefore, at a predetermined timing, the CPU starts a process from a step 500 and then, proceeds with the process to a step 510 to determine whether a condition required to execute the lane keep control is satisfied. Hereinafter, the condition required to execute the lane keep control will be referred to as "the LTA execution condition". The LTA execution condition is satisfied when conditions A1, A2, and A3 described below are satisfied.

The condition A1 is a condition that the execution of the lane keep control is requested by the occupant operating the operation switch 17.

The condition A2 is a condition that the white lane marking information is acquired.

The condition A3 is a condition that the movement speed SPD of the own vehicle 100 is equal to or greater than a first vehicle movement speed threshold and is equal to or smaller than a second vehicle speed movement threshold.

The LTA execution condition is not limited to the aforementioned conditions. For example, the LTA execution condition may be satisfied when a known inter-vehicle distance control (i.e., ACC: Adaptive Cruise Control) is executed, and the conditions A1 to A3 are satisfied. Alternatively, the condition A3 may be omitted.

When the LTA execution condition is not satisfied, the CPU determines "No" at the step 510 and then, proceeds with the process to a step 595 to terminate this routine once. In this case, the lane keep control is not executed.

On the other hand, when the LTA execution condition is satisfied, the CPU determines "Yes" at the step 510 and then, proceeds with the process to a step 520 to determine whether the responsive characteristic condition including the first condition is satisfied. In this embodiment, the responsive characteristic condition is satisfied when the first condition described below is satisfied.

The first condition is a condition that (i) there is the next-lane vehicle 200, and (ii) the longitudinal inter-vehicle distance Dfx (200) is equal to or greater than the second predetermined threshold D2th and is equal to or smaller than the first predetermined threshold D1th. The second predetermined threshold D2th is set to a negative value, and the first predetermined threshold D1th is set to a positive value.

It should be noted that the CPU determines whether there is the next-lane vehicle 200, based on the lane information and the object information. Also, the CPU determines whether the first condition is satisfied, based on the lane information and the object information.

When the responsive characteristic condition is not satisfied, the CPU determines "No" at the step 520 and then, proceeds with the process to a step 530 to set a value of the proportional control gain Kr to the predetermined normal value Krnormal. It should be noted that the control gains K1, K2, K3, and K4 are predetermined constant values. Then, the CPU sequentially executes processes of steps 540 and 550 described below. Then, the CPU proceeds with the process to the step 595 to terminate this routine once.

Step 540: The CPU calculates the target steering angle θ* by using the equation (2).

Step 550: The CPU sends the target steering angle θ* to the steering ECU 40. The steering ECU 40 controls the activation of the steering motor 42 to control the actual steering angle θ to the target steering angle θ*. Thereby, the lane keep control is executed.

As described above, when the responsive characteristic condition is not satisfied, the value of the proportional control gain Kr is set to the relatively small value, i.e., the predetermined normal value Krnormal. Thereby, the target steering angle θ* changes relatively moderately. Thus, the own vehicle 100 moves along the target movement line ML with stability.

On the other hand, when the own vehicle 100 approaches the next-lane vehicle 200, the first condition is satisfied and thus, the responsive characteristic condition is satisfied. In this case, the CPU determines "Yes" at the step 520 and then, sequentially executes processes of steps 560 to 580 described below.

Step 560: The CPU reads parameters used for calculating the responsive characteristic improvement value Krhigh. The parameters are responsive characteristic improvement value calculation parameters. In particular, the CPU reads the longitudinal relative movement speed Vfx(200), the lateral inter-vehicle distance Dfy(200), the size Si(200), and the shape Sh(200) which have been acquired independently from the RAM. The longitudinal relative movement speed Vfx(200) corresponds to a difference between the movement speed of the next-lane vehicle 200 and the movement speed Vj of the own vehicle 100. The lateral inter-vehicle distance Dfy(200) is a distance from the longitudinal center line of the own vehicle 100 to the lateral center position of the next-lane vehicle 200. The size Si(200) is a size of the next-lane vehicle 200. The shape Sh(200) is a parameter representing a shape of the next-lane vehicle.

Step 570: The CPU calculates the responsive characteristic improvement value Krhigh by applying the read parameters to an equation (3) described below. Values α1 to α5 in the equation (3) are positive values. Therefore, the responsive characteristic improvement value Krhigh is greater than the predetermined normal value Krnormal.

$$Kr\text{high}=(1+\alpha 1+\alpha 2+\alpha 3+\alpha 4+\alpha 5)*Kr\text{normal} \quad (3)$$

Degrees of the air pressure change and/or the airstream generated by the next-lane vehicle 200 influencing the own vehicle 100 increases as a magnitude Dfx(200) of the longitudinal inter-vehicle distance Dfx(200) decreases.

Thus, a value α1 in the equation (3) increases as the magnitude Dfx(200) of the longitudinal inter-vehicle distance Dfx(200) decreases.

Further, the degrees of the air pressure change and/or the airstream generated by the next-lane vehicle 200 influencing the own vehicle 100 increases as a magnitude |Vfx(200)| of the longitudinal relative movement speed Vfx(200) increases. Thus, a value α2 in the equation (3) increases as the magnitude Vfx(200) of the longitudinal relative movement speed Vfx(200) increases.

Furthermore, the degrees of the air pressure change and/or the airstream generated by the next-lane vehicle 200 influencing the own vehicle 100 increases as a magnitude Dfy(200) of the lateral inter-vehicle distance Dfy(200) decreases. Thus, a value α3 in the equation (3) increases as the magnitude |Dfy(200)| of the lateral inter-vehicle distance Dfy(200) decreases.

Furthermore, the degrees of the air pressure change and/or the airstream generated by the next-lane vehicle 200 influencing the own vehicle 100 increases as a magnitude |Si(200)| of the size Si(200) increases. Thus, a value α4 in the equation (3) increases as the magnitude |Si(200)| of the size Si(200) increases.

Furthermore, the degrees of the air pressure change and/or the airstream generated by the next-lane vehicle 200 influencing the own vehicle 100 increases as a magnitude |Sh(200)| of the shape Sh(200) increases. Thus, a value α5 in the equation (3) increases as the magnitude |Sh(200)| of the shape Sh(200) increases.

It should be noted that the CPU may be configured to calculate the responsive characteristic improvement value Krhigh by applying the longitudinal inter-vehicle distance Dfx(200), the lateral inter-vehicle distance Dfy(200), the longitudinal relative movement speed Vfx(200), the size Si(200), and the shape Sh(200) to a look-up table MapKrhigh(Dfx,Dfy,Vfx,Si,Sh). The look-up table MapKrhigh(Dfx,Dfy,Vfx,Si,Sh) is a look-up table for acquiring the responsive characteristic improvement value Krhigh, based on the parameters of the longitudinal inter-vehicle distance Dfx(200), the lateral inter-vehicle distance Dfy(200), the longitudinal relative movement speed Vfx(200), the size Si(200), and the shape Sh(200). The look-up table MapKrhigh(Dfx,Dfy,Vfx,Si,Sh) is previously prepared, based on data acquired by experiments and is stored in the ROM of the driving assist ECU 10.

Step 580: The CPU sets the value of the proportional control gain Kr to the responsive characteristic improvement value Krhigh.

Then, the CPU sequentially executes the processes of the steps 540 and 550. In this case, the responsive characteristic condition has been satisfied. Thus, the value of the proportional control gain Kr is set to the responsive characteristic improvement value Krhigh greater than the predetermined normal value Krnormal. Thereby, the target steering angle θ* changes at a relatively large rate. Thus, even when the own vehicle 100 slightly deviates from the target movement line ML, the lateral position and the yaw angle θL of the own vehicle 100 are corrected such that the lateral position of the own vehicle 100 promptly locates on the target movement line ML, and the yaw angle θL of the own vehicle 100 promptly becomes zero. In other words, the lateral position and the yaw angle θL of the own vehicle 100 are corrected such that the own vehicle 100 moves along the target movement line ML.

As described above, according to the vehicle movement control apparatus of the embodiment, when (i) there is the next-lane vehicle 200, and (ii) the longitudinal inter-vehicle distance Dfx(200) is equal to or greater than the second predetermined threshold D2th and is equal to or smaller than the first predetermined threshold D1th, i.e., when the responsive characteristic condition is satisfied, the proportional control gain Kr which is one of the feedback control gains is changed from the predetermined normal value Krnormal to the responsive characteristic improvement value Krhigh.

Thus, the target steering angle *θ changes promptly when the responsive characteristic condition is satisfied. Therefore, when the own vehicle 100 overtakes the next-lane vehicle 200, the own vehicle 100 is unlikely to be displaced temporarily to a large extent in the lane width direction. Also, when the next-lane vehicle 200 overtakes the own vehicle 100, the own vehicle 100 is unlikely to be displaced temporarily to the large extent in the lane width direction. Therefore, the occupants are unlikely to feel uneasy.

Further, the vehicle movement control apparatus of the embodiment changes the responsive characteristic improvement value Krhigh, depending on the longitudinal inter-vehicle distance Dfx(200), the longitudinal relative movement speed Vfx(200), the lateral inter-vehicle distance Dfy(200), the size Si(200), and the shape Sh(200). Therefore, the responsive characteristic of the lane keep control is changed, depending on the degree of the next-lane vehicle 200 influencing the position of the own vehicle 100 in the lane width direction. Thus, the own vehicle 100 is unlikely to be displaced temporarily to the large extent in the lane width direction with causing the own vehicle 100 to move with stability.

It should be noted that the present invention is not limited to the aforementioned embodiment and various modifications can be employed within the scope of the present invention.

For example, the responsive characteristic condition determined at the step 520 in FIG. 5 may include any conditions other than the first condition. In particular, the responsive characteristic condition may include a second condition described below in addition to the first condition.

The second condition is a condition that a magnitude Dfy(200) of the lateral inter-vehicle distance Dfy(200) is equal to or smaller than a third predetermined threshold D3th which is set to a positive value.

The second condition is satisfied when the magnitude Dfy(200) of the lateral inter-vehicle distance Dfy(200) is equal to or smaller than the third predetermined threshold D3th. When the second condition is not satisfied, the air pressure change and/or the airstream generated by the next-lane vehicle 200 is unlikely to influence the own vehicle 100.

Further, the responsive characteristic condition may include a third condition described below in addition to the first condition.

The third condition is a condition that a magnitude Vfx(200) of the longitudinal relative movement speed Vfx(200) is equal to or greater than a predetermined relative movement speed threshold Vfxth which is set to a positive value. When the third condition is not satisfied, i.e., when the next-lane vehicle 200 moves substantially alongside the own vehicle 100, the air pressure change and/or the airstream generated by the next-lane vehicle 200 is unlikely to change the lateral position of the own vehicle 100.

Furthermore, the responsive characteristic condition may include a fourth condition described below in addition to the first condition.

The fourth condition is a condition that the size Si(200) is equal to or greater than a predetermined size threshold Sith.

When the fourth condition is not satisfied, the air pressure change and/or the airstream generated by the next-lane vehicle 200 is unlikely to influence the own vehicle 100.

Furthermore, the responsive characteristic condition may include the first condition and two or more of the second, third, and fourth conditions.

Further, the first condition used when the own vehicle 100 overtakes the next-lane vehicle 200 may be different from the first condition used when the next-lane vehicle 200 overtakes the own vehicle 100.

In particular, the driving assist ECU 10 may be configured to set the first predetermined threshold D1th and the second predetermined threshold D2th to a value D1thA and a value D2thA, respectively when the driving assist ECU 10 determines that the own vehicle 100 overtakes the next-lane vehicle 200. On the other hand, the driving assist ECU 10 may be configured to set the first predetermined threshold D1th and the second predetermined threshold D2th to a value D1thB and a value D2thB, respectively when the driving assist ECU 10 determines that the next-lane vehicle 200 overtakes the own vehicle 100. The value D1thA may be the same as the value D1thB or different from the value D1thB. Similarly, the value D2thA may be the same as the value D2thB or different from the value D2thB.

The driving assist ECU 10 increases the control gain Kr from the predetermined normal value Krnormal to the responsive characteristic improvement value Krhigh for increasing the responsive characteristic of the lane keep control. In this regard, the driving assist ECU 10 may be configured to increase at least one of the control gains K2, K3, K4, and Kr for increasing the responsive characteristic of the lane keep control when the responsive characteristic condition is satisfied.

Further, the driving assist ECU 10 may be configured to increase a change rate upper limit dθ*Limit for a temporal change rate dθ*/dt of the target steering angle θ* for increasing the responsive characteristic of the lane keep control in addition to or in place of increasing at least one of the control gains K2, K3, K4, and Kr.

In particular, the driving assist ECU 10 may calculate a change amount Δθ* of the target steering angle θ* in a predetermined constant time of period as a value corresponding to the temporal change rate dθ*/dt of the target steering angle θ*. The driving assist ECU 10 may limit the target steering angle θ* such that a magnitude |Δθ*| of the change amount Δθ* becomes equal to the change rate upper limit dθ*Limit when the magnitude |Δθ*| of the change amount Δθ* is greater than the change rate upper limit dθ*Limit. The driving assist ECU 10 may change the change rate upper limit dθ*Limit from a normal value dθ*LimitN to a responsive characteristic improvement value dθ*LimitH when the responsive characteristic condition is satisfied. Thereby, the magnitude |Δθ*| of the change amount Δθ* of the target steering angle θ* during a constant period of time is allowed to increase. Thus, the responsive characteristic of the lane keep control is increased.

Further, the driving assist ECU 10 may be configured to increase a steering angle upper limit θ*Limit used for limiting the magnitude |θ*| of the target steering angle θ* for increasing the responsive characteristic of the lane keep control.

In particular, the driving assist ECU 10 may limit the target steering angle θ* such that the magnitude |θ*| of the target steering angle θ* becomes equal to the steering angle upper limit |θ*limit when the magnitude θ* of the target steering angle θ* is greater than the steering angle upper limit θ*Limit. The driving assist ECU 10 may change the steering angle upper limit θ*Limit from a normal value θ*LimitN to a responsive characteristic improvement value θ*LimitH when the responsive characteristic condition is satisfied. Thereby, a maximum value of the magnitude |θ*| of the target steering angle θ* is increased. Thus, the responsive characteristic of the lane keep control is increased.

Further, the driving assist ECU 10 is configured to calculate the responsive characteristic improvement value Krhigh at the step 570, based on the equation (3). In this regard, the driving assist ECU 10 may be configured to set the responsive characteristic improvement value Krhigh to a predetermined constant value. Further, the driving assist ECU 10 may be configured to set one or more of the values α1 to α5 in the equation (3) to a variable(s) greater than zero and set the remainder(s) of the values α1 to α5 to a constant value(s) (e.g., zero).

Further, the driving assist ECU 10 may be configured to calculate a target yaw rate YRc* by using an equation (2') in place of the equation (2) and calculate a target steering torque Tr* for achieving the target yaw rate YRc* by using a look-up table, based on the target yaw rate YRc* and the actual yaw rate YRt.

$$YRc^* = M1^*CL + Mr^*(M2^*\theta L + M3^*dL + M4^*\Sigma dL) \qquad (2')$$

In this case, the driving assist ECU 10 may be configured to control the activation of the steering motor 42 by using the steering ECU 40 to control the actual steering torque Tra to the target steering torque Tr*. It should be noted that values M1, M2, M3, M4, and Mr in the equation (2') are the control gains. The driving assist ECU 10 may be further configured to set at least one of the control gains M2, M3, M4, and Mr when the responsive characteristic condition is satisfied such that the at least one control gain is larger, compared with when the responsive characteristic condition is not satisfied.

The driving assist ECU 10 is configured to set the target movement line ML to the center line of the own vehicle lane OLN defined by connecting the center points between the left white lane marking LL1 and the right white lane marking RL1 in the lane width direction. In this regard, the driving assist ECU 10 may be configured to set the target movement line ML to an arbitrary line in the own vehicle lane OLN determined, based on at least one of the left white lane marking LL1 and the right white lane marking RL1. In particular, the driving assist ECU 10 may be configured to set the target movement line ML to a line parallel to and away from the center line ML by a predetermine distance in the lane width direction.

Further, in the embodiment, the camera sensors 16*b* are configured to process the acquired image data and send the object information and the lane information acquired by processing the image data to the driving assist ECU 10. Alternatively, the camera sensors 16*b* may be configured to send the acquired image data to the driving assist ECU 10, and the driving assist ECU 10 may be configured to process the image data to acquire the object information and the lane information.

Further, in the embodiment, the camera sensors 16*b* include the stereo cameras. In this regard, the camera sensors 16*b* may include monocular cameras. In particular, any type of cameras may be used as the camera sensors as far as the driving assist ECU 10 can acquire the object information including the longitudinal inter-vehicle distance Dfx(n), the longitudinal relative movement speed Vfx(n), the lateral inter-vehicle distance Dfy(n), the lateral relative movement speed Vfy(n), the height h(n), the width w(n), the length l(n), and the shape Sh(n) and the lane information.

Further, a part or all of the vehicle surrounding information including the lane information and the object information may be acquired by an inter-vehicle communication, or by a communication between the own vehicle 100 and a center, or from a navigation system of the own vehicle 100, or the like.

What is claimed is:

1. A vehicle movement control apparatus, comprising:
   at least one sensor for detecting (I) a shape of an own vehicle lane in which an own vehicle moves and (ii) an object existing around the own vehicle; and
   an electronic control unit configured to:
      acquire vehicle surrounding information on (i) the shape of the own vehicle lane and (ii) the object, based on information provided from the at least one sensor; and
      execute a steering control to change a steering angle of the own vehicle at a predetermined changing rate, based on the vehicle surrounding information to cause the own vehicle to move along a target movement line set in the own vehicle lane,
   wherein the electronic control unit is configured to:
      determine whether a predetermined responsive characteristic condition is satisfied, based on the vehicle surrounding information, the predetermined responsive characteristic condition being satisfied when (i) the other vehicle moves in the vehicle lane next to the own vehicle lane, and (ii) the other vehicle exists in a predetermined area, and the predetermined area being defined by (i) a location ahead of the own vehicle by a first distance and (ii) a location behind the own vehicle by a second distance; and
      execute the steering control with increasing the predetermined changing rate to a larger changing rate when the electronic control unit determines that the predetermined responsive characteristic condition is satisfied, compared with when the electronic control unit determines that the predetermined responsive characteristic condition is not satisfied.

2. The vehicle movement control apparatus as set forth in claim 1, wherein
   the electronic control unit is further configured to:
      acquire a gap amount based, on the vehicle surrounding information, the gap amount representing a gap between the target movement line and an actual line of movement of the own vehicle;
      calculate a feedback control amount including a value acquired by multiplying a value depending on the gap amount by a predetermined control gain; and
      execute the steering control, based on at least the feedback control amount with increasing the predetermined changing rate to the larger changing rate by increasing the predetermined control gain to a larger value when the electronic control unit determines that the predetermined responsive characteristic condition is satisfied, compared with when the electronic control unit determines that the predetermined responsive characteristic condition is not satisfied.

3. The vehicle movement control apparatus as set forth in claim 1, wherein
   the electronic control unit is further configured to:
      acquire a gap correlation value, based on the vehicle surrounding information, the gap correlation value correlating with a gap amount representing a gap between the target movement line and an actual movement line of the own vehicle;
      calculate a steering angle control amount for reducing the gap amount, based on the gap correlation value; and
      execute the steering control so as to change the steering angle of the own vehicle, based on the steering angle control amount with increasing the predetermined changing rate to the larger changing rate by increasing a ratio of the steering angle control amount relative to the gap correlation amount to a larger ratio when the electronic control unit determines that the predetermined responsive characteristic condition is satisfied, compared with when the electronic control unit determines that the predetermined responsive characteristic condition is not satisfied.

4. The vehicle movement control apparatus as set forth in claim 1, wherein
   the electronic control unit is further configured to:
      limit the predetermined changing rate to a predetermined upper limit when the predetermined changing rate is greater than the predetermined upper limit; and
      execute the steering control with increasing the predetermined changing rate to the larger changing rate by increasing the predetermined upper limit to a larger limit when the electronic control unit determines that the predetermined responsive characteristic condition is satisfied, compared with when the electronic control unit determines that the predetermined responsive characteristic condition is not satisfied.

5. The vehicle movement control apparatus as set forth in claim 1, wherein
   the electronic control unit is further configured to:
      acquire a lateral distance, based on the vehicle surrounding information, the lateral distance being a distance between the own vehicle and the other vehicle along a width direction of the own vehicle lane;
      determine whether the lateral distance is equal to or smaller than a predetermined lateral distance threshold; and
      determine that the predetermined responsive characteristic condition is satisfied when (I) the other vehicle moves in the vehicle lane next to the own vehicle lane, (ii) the other vehicle exists in the predetermined area, and (iii) the lateral distance is equal to or smaller than the predetermined lateral distance threshold.

6. The vehicle movement control apparatus as set forth in claim 1, wherein
   the electronic control unit is further configured to:
      acquire a relative movement speed, based on the vehicle surrounding information, the relative movement speed being a difference between a movement speed of the own vehicle and a movement speed of the other vehicle;
      determine whether the relative movement speed is equal to or greater than a predetermined relative movement speed threshold; and
      determine that the predetermined responsive characteristic condition is satisfied when (I) the other vehicle moves in the vehicle lane next to the own vehicle lane, (ii) the other vehicle exists in the predetermined area, and (iii) the relative movement speed is equal to or greater than the predetermined relative movement speed threshold.

7. The vehicle movement control apparatus as set forth in claim 1, wherein the electronic control unit is further configured to:
  acquire a size of the other vehicle, based on the vehicle surrounding information;
  determine whether the size of the other vehicle is equal to or greater than a predetermined size threshold; and
  determine that the predetermined responsive characteristic condition is satisfied when (i) the other vehicle moves in the vehicle lane next to the own vehicle lane, (ii) the other vehicle exists in the predetermined area, and (iii) the size of the other vehicle is equal to or greater than the predetermined size threshold.

8. The vehicle movement control apparatus as set forth in claim 1, wherein
the electronic control unit is further configured to:
  acquire a longitudinal distance, based on the vehicle surrounding information, the longitudinal distance being a distance between the own vehicle and the other vehicle along a longitudinal direction of the own vehicle lane; and
  execute the steering control with increasing the predetermined changing rate to the larger changing rate which increases as the longitudinal distance decreases when the electronic control unit determines that the predetermined responsive characteristic condition is satisfied.

9. The vehicle movement control apparatus as set forth in claim 1, wherein
the electronic control unit is further configured to:
  acquire a relative movement speed, based on the vehicle surrounding information, the relative movement speed being a difference between a movement speed of the own vehicle and a movement speed of the other vehicle; and
  execute the steering control with increasing the predetermined changing rate to the larger changing rate which increases as the relative movement speed increases when the electronic control unit determines that the predetermined responsive characteristic condition is satisfied.

10. The vehicle movement control apparatus as set forth in claim 1, wherein
the electronic control unit is further configured to:
  acquire a lateral distance, based on the vehicle surrounding information, the lateral distance being a distance between the own vehicle and the other vehicle along a width direction of the own vehicle lane; and
  execute the steering control with increasing the predetermined changing rate to the larger changing rate which increases as the lateral distance decreases when the electronic control unit determines that the predetermined responsive characteristic condition is satisfied.

11. The vehicle movement control apparatus as set forth in claim 1, wherein
the electronic control unit is further configured to:
  acquire a size of the other vehicle, based on the vehicle surrounding information; and
  execute the steering control with increasing the predetermined changing rate to the larger changing rate which increases as the size of the other vehicle increases when the electronic control unit determines that the predetermined responsive characteristic condition is satisfied.

12. The vehicle movement control apparatus as set forth in claim 1, wherein
the electronic control unit is further configured to:
  acquire a shape of the other vehicle, based on the vehicle surrounding information; and
  execute the steering control with increasing the predetermined changing rate to the larger changing rate, depending on the shape of the other vehicle when the electronic control unit determines that the predetermined responsive characteristic condition is satisfied.

* * * * *